No. 716,177. Patented Dec. 16, 1902.
J. J. BELL.
COMBINED CHUCK AND COUNTERSINK.
(Application filed Apr. 4, 1900.)
(No Model.)
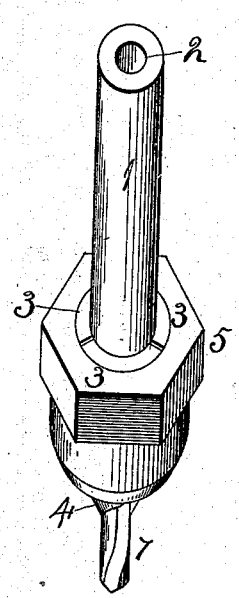
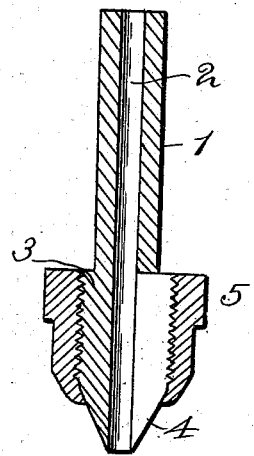
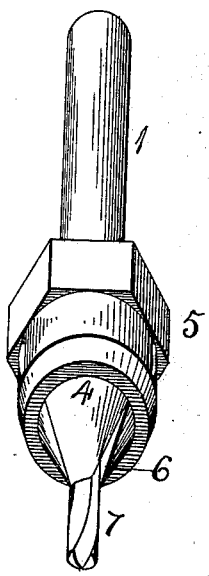
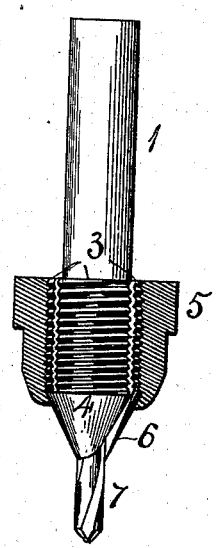
Witnesses:
I. Sovereign
E. Behel.
Inventor:
Jason J. Bell
By A. O. Behel
Atty.

UNITED STATES PATENT OFFICE.

JASON J. BELL, OF GARDEN PRAIRIE, ILLINOIS, ASSIGNOR OF ONE-HALF TO AURELIUS G. WHITE, OF GARDEN PRAIRIE, ILLINOIS.

COMBINED CHUCK AND COUNTERSINK.

SPECIFICATION forming part of Letters Patent No. 716,177, dated December 16, 1902.

Application filed April 4, 1900. Serial No. 11,558. (No model.)

*To all whom it may concern:*

Be it known that I, JASON J. BELL, a citizen of the United States, residing at Garden Prairie, in the county of Boone and State of Illinois, have invented certain new and useful Improvements in a Combined Chuck and Countersink, of which the following is a specification.

The object of this invention is to form the jaws of a drill-holding chuck in countersink form in order that a hole may be drilled and formed with a countersink at a single downward movement of the drill.

In the accompanying drawings, Figure 1 is an isometrical representation of my improved combined chuck and countersink as seen from the top. Fig. 2 is a similar view as seen from the under face. Fig. 3 is an elevation, the clamping-nut being shown in section. Fig. 4 is a longitudinal section of the device, taken on a plane passing through one of the slits.

The chuck is formed of a hollow shank having a lengthwise opening 2. The shank consists of an integral structure constructed with a pair of cylindrical portions 1 3 and a tapering portion 4. The cylindrical portion 3 is of greater diameter than the cylindrical portion 1 and is arranged at one end of the latter, as well as being exteriorly screw-threaded. The tapering portion 4 is arranged at the other end of the cylindrical portion 3, and the latter, as well as the former, is suitably slitted from end to end, which forms the said portions 3 and 4 into a plurality of elastic gripping and cutting jaws 6, these latter having their ends provided with a cut-away portion to form cutting edges for making the countersinks.

The reference-numeral 5 denotes a clamping-nut mounted upon the screw-threads of the cylindrical portions 3 and engaging the jaws 6 for clamping them in position. A drill 7 is inserted between the jaws of the chuck, and by turning the nut 5 in connection with the jaws the jaws will clamp the drill and hold it in connection with the chuck. The chuck can be inserted in the spindle of a drilling-machine or head of a lathe and will be driven by either.

When the drill is presented against the material to be operated upon and a hole is drilled, the jaws of the chuck will come in contact with the material and form a countersink in the material without the drill being withdrawn from the material. The drill can be extended more or less, as required for drilling, and the countersink is always ready to perform its work without any especial preparations or handling of tools.

I claim as my invention—

1. A combined drill-chuck and countersink comprising a drill-receiving hollow shank provided with a pair of cylindrical portions of different diameters and a tapering portion at one end of the cylindrical portion of larger diameter, said tapering portion provided with cutting edges to form a countersink and said cylindrical portion of larger diameter externally screw-threaded, said cylindrical portion of larger diameter and said tapering portion provided with a plurality of slits extending from end to end thereof forming the said tapering portion into a plurality of elastic cutting-jaws and the portion of larger diameter into a plurality of gripping-jaws, and a clamping-nut mounted on said cylindrical portion of larger diameter and engaging the jaws for compressing them around the drill and clamping the latter in position.

2. In combination a shank provided with a plurality of elastic gripping and cutting jaws for forming a countersink, a drill mounted in the shank and projecting from the cutting edges of the jaws, and means mounted upon the shank for compressing the elastic cutting-jaws tightly around said drill and clamping the latter within the shank.

JASON J. BELL.

Witnesses:
J. C. WEBSTER,
F. J. K. JUEHRS.